United States Patent
Allen

(10) Patent No.: US 8,913,104 B2
(45) Date of Patent: Dec. 16, 2014

(54) AUDIO SYNCHRONIZATION FOR TWO DIMENSIONAL AND THREE DIMENSIONAL VIDEO SIGNALS

(75) Inventor: William Allen, Westborough, MA (US)

(73) Assignee: Bose Corporation, Framingham, MA (US)

( * ) Notice: Subject to any disclaimer, the term of this patent is extended or adjusted under 35 U.S.C. 154(b) by 320 days.

(21) Appl. No.: 13/114,311

(22) Filed: May 24, 2011

(65) Prior Publication Data

US 2012/0300026 A1 Nov. 29, 2012

(51) Int. Cl.
*H04N 13/00* (2006.01)
*H04N 21/2368* (2011.01)

(52) U.S. Cl.
CPC ....... *H04N 13/0048* (2013.01); *H04N 13/0055* (2013.01); *H04N 13/0059* (2013.01); *H04N 21/2368* (2013.01)
USPC .......................................................... 348/43

(58) Field of Classification Search
CPC .......... H04N 13/0059; H04N 13/0055; H04N 13/0048; H04N 21/2368
USPC ....................... 348/43, 515; 704/217; 709/209
See application file for complete search history.

(56) References Cited

U.S. PATENT DOCUMENTS

| | | | | |
|---|---|---|---|---|
| 4,646,172 A | * | 2/1987 | Lemelson | 386/337 |
| 5,129,004 A | * | 7/1992 | Imai et al. | 381/86 |
| 5,903,261 A | * | 5/1999 | Walsh et al. | 715/201 |
| 6,392,689 B1 | * | 5/2002 | Dolgoff | 348/44 |
| 6,445,798 B1 | * | 9/2002 | Spikener | 381/63 |
| 6,862,044 B2 | * | 3/2005 | Kariatsumari | 348/515 |
| 6,912,010 B2 | * | 6/2005 | Baker et al. | 348/515 |
| 7,136,399 B2 | * | 11/2006 | Lanigan et al. | 370/517 |
| 7,212,247 B2 | * | 5/2007 | Albean | 348/515 |
| 7,480,008 B2 | * | 1/2009 | Kim | 348/515 |
| 7,511,763 B2 | * | 3/2009 | Sasaki | 348/515 |
| 8,525,884 B2 | * | 9/2013 | Steinberg et al. | 348/181 |
| 2001/0015753 A1 | * | 8/2001 | Myers | 348/51 |
| 2002/0165912 A1 | * | 11/2002 | Wenocur et al. | 709/203 |
| 2003/0179317 A1 | * | 9/2003 | Sigworth | 348/515 |
| 2006/0056816 A1 | * | 3/2006 | Shimagami et al. | 386/125 |
| 2006/0251276 A1 | * | 11/2006 | Chen | 381/310 |
| 2007/0091207 A1 | * | 4/2007 | Aufranc et al. | 348/462 |
| 2008/0091418 A1 | * | 4/2008 | Laaksonen et al. | 704/217 |
| 2008/0138032 A1 | * | 6/2008 | Leyendecker et al. | 386/66 |
| 2008/0273116 A1 | * | 11/2008 | Gentric | 348/515 |
| 2009/0258677 A1 | * | 10/2009 | Ellis et al. | 455/556.1 |
| 2009/0290064 A1 | * | 11/2009 | Matsumoto et al. | 348/515 |
| 2009/0304186 A1 | * | 12/2009 | Katayama et al. | 381/1 |
| 2011/0025927 A1 | * | 2/2011 | Yana et al. | 348/739 |
| 2011/0074921 A1 | * | 3/2011 | Takiduka et al. | 348/43 |

(Continued)

FOREIGN PATENT DOCUMENTS

| | | |
|---|---|---|
| EP | 1046281 | 10/2000 |
| WO | 2009038615 | 3/2009 |

*Primary Examiner* — Richard Torrente
*Assistant Examiner* — Joseph Suh
(74) *Attorney, Agent, or Firm* — Brian M. Dingman; Bingman, McInnes & McLane, LLP

(57) ABSTRACT

A method for processing audio/video signals. The method includes determining if the video signals are in two dimensional or three dimensional format. If the video signals are in two dimensional format, the method includes providing a first delay to be applied to the audio signals. If the video signals are in three dimensional format, the method includes providing a second delay, longer than the first delay, to be applied to the audio signals.

12 Claims, 4 Drawing Sheets

(56) References Cited

U.S. PATENT DOCUMENTS

| | | | |
|---|---|---|---|
| 2011/0129198 A1* | 6/2011 | Toma et al. | 386/239 |
| 2011/0141238 A1* | 6/2011 | Tsukagoshi | 348/46 |
| 2011/0157310 A1* | 6/2011 | Mitani et al. | 348/43 |
| 2011/0157327 A1* | 6/2011 | Seshadri et al. | 348/51 |
| 2011/0181700 A1* | 7/2011 | Oshima et al. | 348/43 |
| 2011/0187927 A1* | 8/2011 | Simon | 348/500 |
| 2011/0217025 A1* | 9/2011 | Begen et al. | 386/338 |
| 2011/0285818 A1* | 11/2011 | Park et al. | 348/43 |
| 2012/0212579 A1* | 8/2012 | Frojdh et al. | 348/43 |
| 2012/0314028 A1* | 12/2012 | Bruls | 348/43 |

\* cited by examiner

AUDIO SYNCHRONIZATION FOR TWO DIMENSIONAL AND THREE DIMENSIONAL VIDEO SIGNALS

BACKGROUND

This specification describes an audio-video system capable of rendering two dimensional and three dimensional video images.

SUMMARY

In one aspect, a method for processing audio/video signals includes determining if the video signals are in two dimensional or three dimensional format. If the video signals are in two dimensional format, the method includes providing a first delay to be applied to the audio signals and if the video signals are in three dimensional format, the method includes providing a second delay, longer than the first delay, to be applied to the audio signals. Providing the first delay may include providing a first range of delays having a minimum and a maximum to be applied to the audio signals and providing the second delay comprises providing a second range of delays having a minimum and a maximum to be applied to the audio signals. The maximum of the second range of delays may be greater than the maximum of the first range of delays. The method may further include modifying, based on user input, a time delay from within the range of the first range of delay or the second range of delays and applying the selected time delay to the audio signals. The minimum of the second range of delays may be greater than the minimum of the first range of delays. The method may further include removing audio signal data from the audio signals to provide modified audio signals and transmitting the video signals to a television for processing. The method may further include transmitting the modified audio signals to the television. The modified audio signals may cause a loudspeaker system of the television to radiate no sound.

In another aspect, a method for processing audio/video signals, includes determining if the video signals are in two dimensional or three dimensional format. If the video signals are in two dimensional format the method may further include providing a first range of delays bounded by a first minimum delay and a first maximum delay to be applied to the decoded audio signals. If the video signals are in three dimensional format, the method may include providing a second range of delays bounded by a second minimum delay and a second maximum delay. The second maximum delay may be longer than the first maximum delay to be applied to the decoded audio signals. The second minimum delay may be longer than the first minimum delay. The second minimum delay may be longer than the first maximum delay. If the video signals are in two dimensional format, the method may include selecting, responsive to input from a user, a delay selected from within the first range of delays. If the video signals are in three dimensional format, the method may include selecting, responsive to input from a user, a delay selected from within the second range of delays. The method may include removing audio signal data from the audio signals to provide modified audio signals and transmitting the video signals to a television for processing. The method may further include transmitting the modified audio signals to the television and the modified audio signals cause a loudspeaker system of the television to radiate no sound.

In another aspect, an audio system includes circuitry for receiving audio-video signals; circuitry for transducing audio signals to provide sound waves that are synchronized with a video image, circuitry for determining if the video signals are in two dimensional format or three dimensional format; circuitry for delaying the audio signals by a first amount if the video signals are in two dimensional format; circuitry for delaying the audio signals by a second amount, longer than the first amount if the video signals are in three dimensional format; and circuitry for transmitting the video signals to a video reproduction system that operates independently of the audio system. The audio system may further include circuitry for removing audio signal data from the audio signals prior to transmission to the video reproduction.

Other features, objects, and advantages will become apparent from the following detailed description, when read in connection with the following drawing, in which:

DETAILED DESCRIPTION

Figure 1:
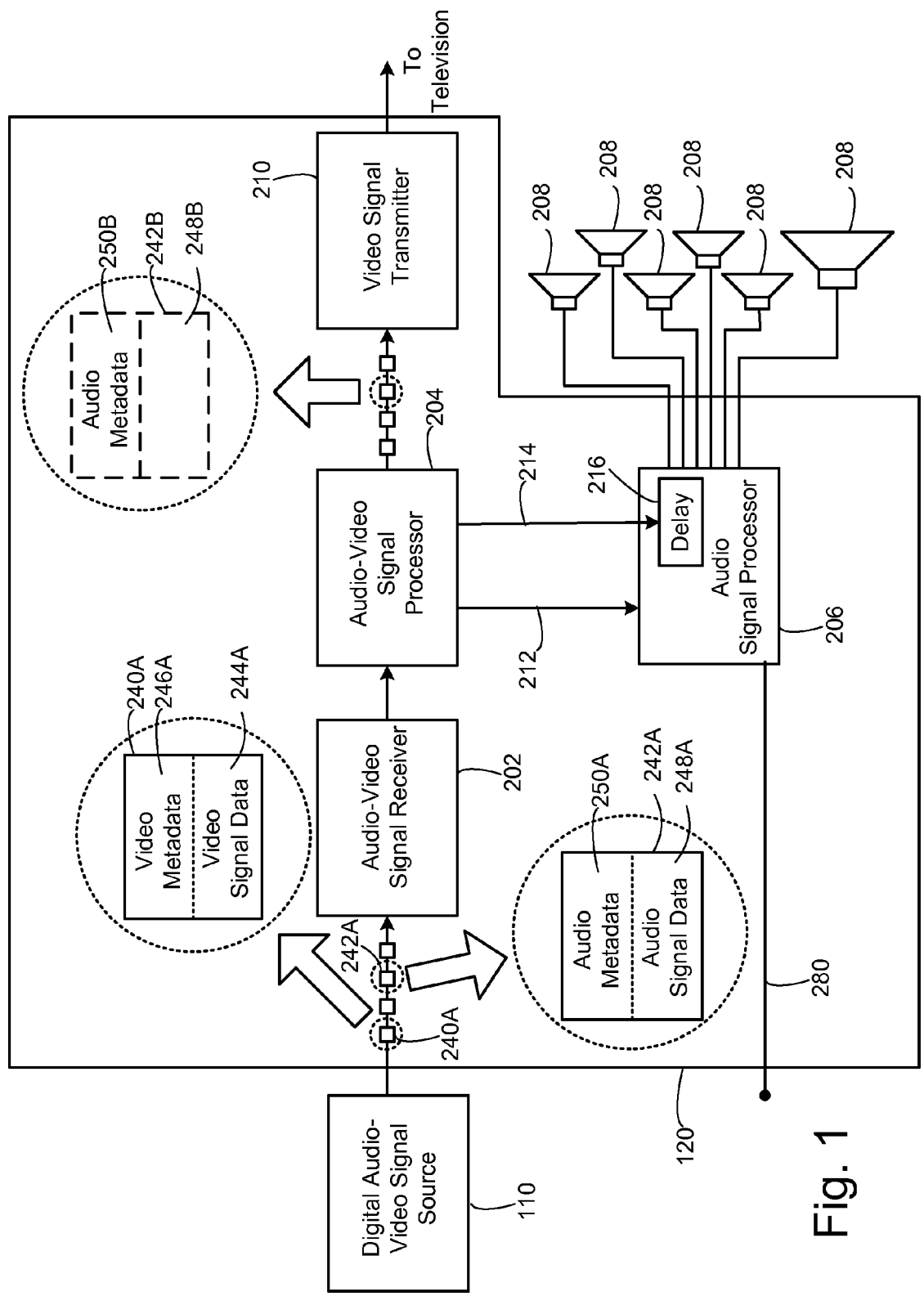
FIGS. 1 and 2 are block diagrams of an audio system usable as a component of an audio-video system.

Though the elements of several views of the drawing may be shown and described as discrete elements in a block diagram and may be referred to as "circuitry", unless otherwise indicated, the elements may be implemented as one of, or a combination of, analog circuitry, digital circuitry, or one or more microprocessors executing software instructions. The software instructions may include digital signal processing (DSP) instructions. Operations may be performed by analog circuitry or by a microprocessor executing software that performs the mathematical or logical equivalent to the analog operation. Unless otherwise indicated, signal lines may be implemented as discrete analog or digital signal lines, as a single discrete digital signal line with appropriate signal processing to process separate streams of audio and/or video signals, or as elements of a wireless communication system. Some of the processes may be described in block diagrams. The activities that are performed in each block may be performed by one element or by a plurality of elements, and may be separated in time. The elements that perform the activities of a block may be physically separated. Unless otherwise indicated, audio signals or video signals or both may be encoded and transmitted in either digital or analog form; conventional digital-to-analog or analog-to-digital converters may not be shown in the figures.

FIG. 1 shows a block diagram of an audio system 120 to provide the audio portion of an audio-visual entertainment system, such as a home theater system. The audio system includes an audio-video (hereinafter a-v) receiver 202 configured to receive input from a digital a-v signal source 110. The a-v signal receiver is operationally coupled to an a-v signal processor 204. The a-v signal processor 204 is operationally coupled to an audio signal processor 206 to provide data signals (as indicated by data signal line 212) and to provide control and/or informational signals (as indicated by control signal line 214) to the audio signal processor. The a-v signal processor 204 is also operationally coupled to a video signal transmitter 210. The video signal transmitter 210 is configured to transmit video signals to a television operating independently of the audio system 120. The television is not shown in this view. Audio input signal line 280 will be described below.

In operation, the a-v signal receiver 202 receives digital a-v signals from the digital a-v signal source 110 and provides the a-v signal to the a-v signal processor 204. The a-v signal receiver may also select one of a plurality of a-v sources, as will be explained below. The a-v signal processor 204 separates the audio data signals from the video signals, and provides the audio data signals to the audio signal processor 206 through audio signal line 212 and provides the video signals to the video signal transmitter 210. The a-v signal processor 204 also provides audio control signals to the audio signal processor 206, as indicated by signal line 214. The audio signal processor 206 processes the audio signals and provides the processed audio signals to acoustic drivers 208 which radiate sound corresponding to a video image on the television, not shown in this view. Further details of the operation of the audio system 120 are below.

It is important for the sound waves radiated by the acoustic drivers 208 to be "synched" (synchronized) with the image on a video display. However, maintaining synchronization may be difficult, because the signals from the various A/V signal sources may be in a number of different formats, which require different amounts of time to process. Maintaining synchronization is particularly difficult in an audio system such as the system of FIG. 1, that is designed to be operable with many models of televisions produced by many different manufacturers. The processing of the video signals by the television and the processing of the audio signals are independent and the television provides insufficient control or informational signals to the audio system 120 to assist the audio system to maintain synchronization. Typically, a-v systems provide some user adjustment to the synching in the event that the synching done by the system does not yield a desired result.

Normally, processing and rendering of video signals takes longer than processing and rendering of audio signals. A typical processing and rendering time for video signals is 150 ms, while a typical processing and rendering time for audio signals is 30 ms. Synching usually involves applying a delay (indicated by delay 216) to the audio signals, of, for example, about 120 ms. One factor that can dramatically affect the processing and rendering time for video signals is whether the video signals are two dimensional (2D) or three dimensional (3D). The processing and rendering of 3D video signals may take as long as 400 ms, compared with a typical processing and rendering time of 150 ms for non-3D video signals.

Digital audio and digital video signals are transmitted in discrete units, as indicated by blocks 240A and 242A. Each unit of audio and video signal may include two types of information: the audio signal data or video signal data (248A and 244A, respectively) and metadata, i.e., information about the audio signal data or video signal data (250A and 246A, respectively). Audio metadata may include encoding format data, number of channels, and the like. Video metadata may include information such as the number of horizontal scan lines per frame (an indication of whether the video signal is high definition [HD] or standard definition [SD]); whether the video signal is interleaved (i) or progressive (p); and whether the video signals are formatted for two dimensional or three dimensional rendering; and others. One protocol for digitally transmitting a-v data is the high definition multimedia interface (HDMI) protocol.

The metadata permits information about the video signals to be used in the decoding and processing of audio signals.

In operation, the a-v signal processor 204 determines, by examining the video signal metadata, whether the video signal is a 3D signal or a 2D video signal. If the video signal is 3D, the a-v signal processor 204 causes the audio signal processor to put a command on command signal line 214 to (a) delay the audio signal by an amount that will maintain synchronization between the video image and the corresponding sound waves or (b) provide the user with a synching adjustment range suitable for 3D video signals, or both (a) and (b).

In an audio system according to FIG. 1, the sound waves are radiated by the audio system 120 and not by the television. It may be desirable for the audio system 120 to prevent the sound system of the television from radiating sound. The audio system may prevent the television's sound system from radiating sound in a number of ways. For example, the audio-video signal processor 204 may eliminate audio signals or the audio-video signal processor 204 may eliminate the audio signal data portion of the audio signal with audio signal data that represents silence.

Figure 2:
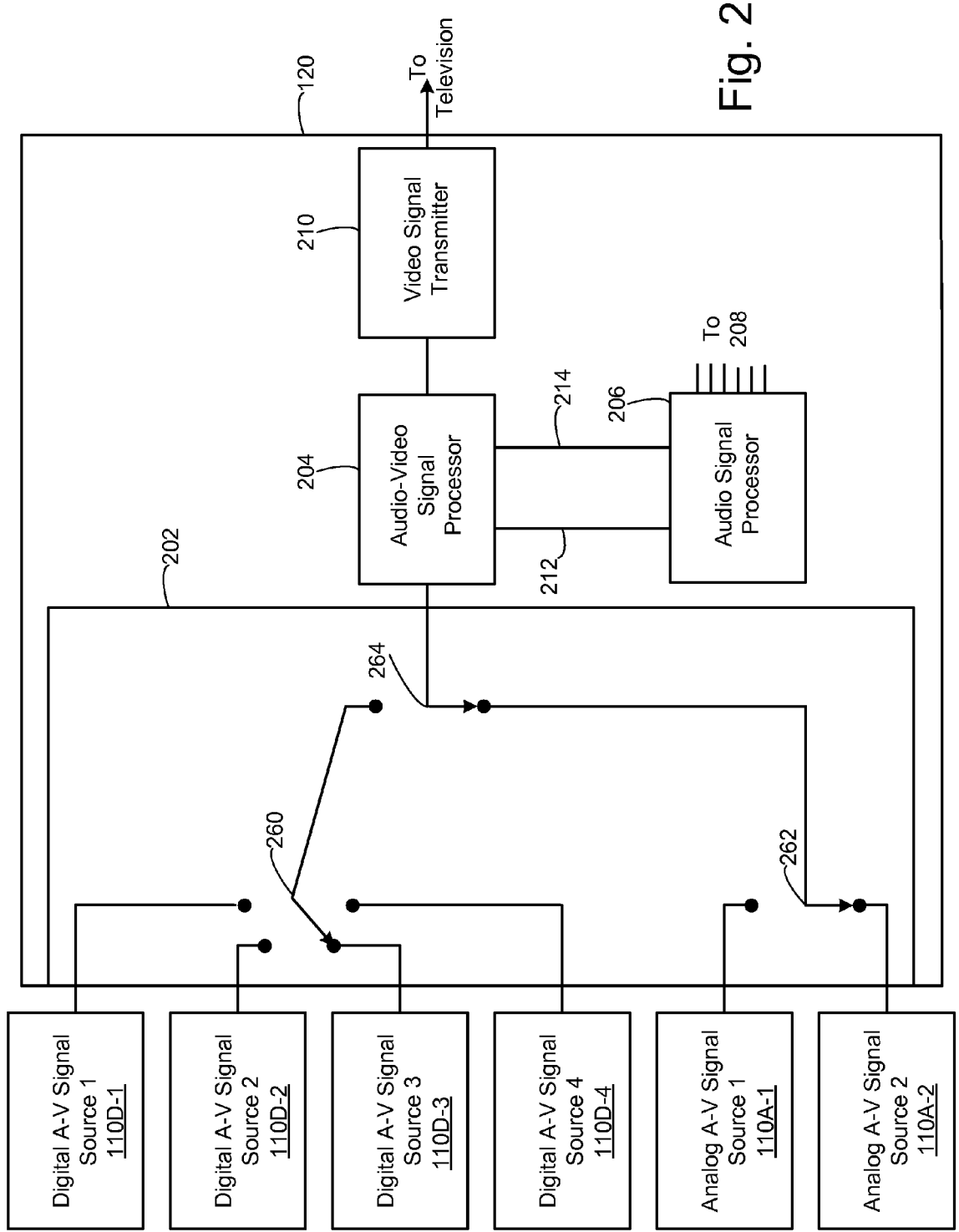

For simplicity of explanation, the audio system 120 of FIG. 1 is configured to receive a-v signals from only a single a-v signal source, and the single a-v source is digital. In such a system configured to receive a-v signals from only a single a-v signal source, the audio-video signal receiver 202 may not be necessary. However, most audio-video systems are configured to receive a-v signals from a plurality of a-v signal sources, and one or more of the plurality of a-v signal sources may be analog. FIG. 2 shows a block diagram of an audio system that is configured to receive a-v signals from a plurality of digital a-v signal sources 110D-1-110D-n (in this example, n=4) and two analog signal sources 110A-1 and 110A-2.

In an audio system of FIG. 2, receiver 202 includes a switch 260 that permits the selection of one of digital audio sources 110D-1-110D-4, a switch 262 that permits the selection of one of the analog sources 110A-1 or 110A-2, and a switch 264 that permits the selection of the analog source or the video source. Analog a-v signal sources 110A-1 and 110A-2 may not include metadata that permits the audio-video signal processor 204 to determine if the video signal is 3D or 2D; however this is not a significant disadvantage, since no convention currently exists for conveying analog a-v signals in 3D format.

Examples of digital audio-video sources 110D-1-110D-4 are cable or satellite receivers; digital video recorders (DVRs) or personal video recorders (PVRs); DVD players; local or wide area network connections; and others. Examples of analog audio-video sources 110A-1 and 110A-2 are VCRs and some a-v gaming consoles. Audio input signal line 280 of FIG. 1 may also be present, but is omitted from this figure.

Figure 3:
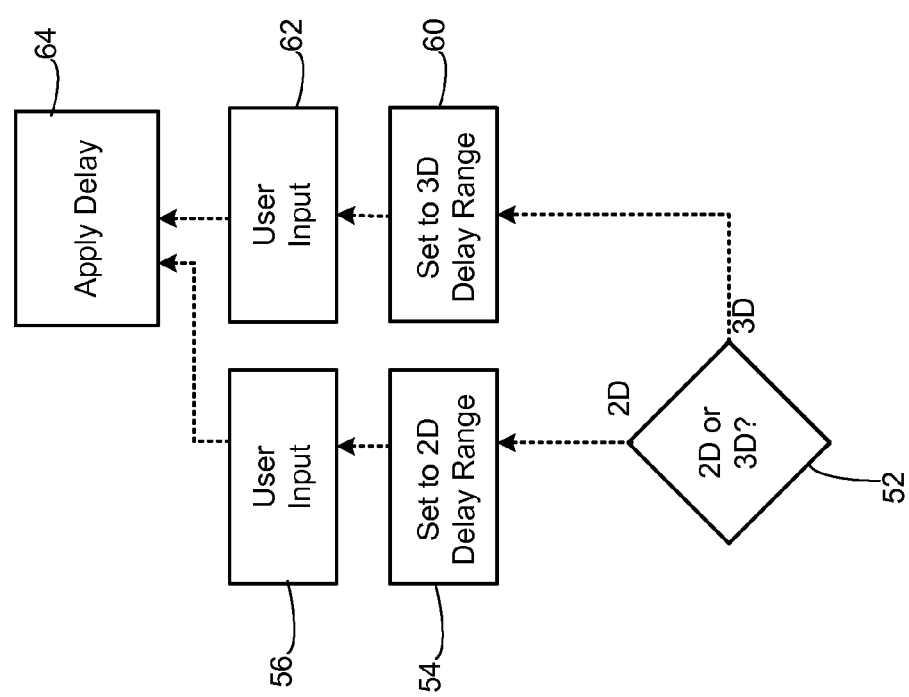

FIG. 3 shows an example of a process for using information about the video signals to be used in processing the audio signals.

The video metadata is examined at block 52 to determine if the video signal is in two dimensional format or three dimensional format. If the video signal is in three dimensional format at block 60, a time delay (or in the this example, a range of time delays) appropriate to three dimensional video signal processing is provided to block 62. At block 62 a time delay within the range of time delays is determined based on user input. The time delay is provided to block 64. At block 64, the time delay is applied to the decoded audio signal.

If the video signal is in two dimensional format, at block 54 a time delay (or in the this example, a range of time delays) appropriate to two dimensional video signal processing is provided to block 56. At block 56, a time delay within the range of time delays is determined based on user input. The time delay is provided to block 64, at which the time delay is applied to the decoded audio signal.

The user input at blocks 56 and 62 can be provided, for example, by a mechanical slide bar or rotary knob, or by a user controllable graphical representation of a mechanical slide bar or knob, or by a user controllable digital user interface. The setting of delay ranges at blocks 60 and 54 rather than the setting of specific time delays permits giving the user the opportunity to fine tune the synchronization independently for two dimensional or three dimensional video.

In one implementation, a minimum audio delay, a maximum 2D audio delay, a maximum 3D audio delay, and a desired step size are used to determined a number of audio delayed steps displayed to the user. For example, assume that the minimum delay is −50 ms (the minus sign indicating that the audio signal may exit audio signal processor 206 50 ms before the corresponding the corresponding video signal exits audio-video signal processor 204), the 2D maximum audio delay is +125 ms, the 3D maximum audio delay is +350 ms, and the desired step size is 25 ms. If it is determined that the video signal is 2D, the user may be presented with eight audio delay steps: −2 (=−50 ms); −1 (=−ms); 0 (=0 ms); +1 (=+25 ms); +2 (=+50 ms); +3 (=+75 ms); +4 (=+100 ms); and +5 (=+125 ms). If it is determined that the video signal is 3D, the user may be presented with 17 audio delay steps: −2 (=−50 ms); . . . and +14 (=+350 ms).

In another implementation, a separate 2D minimum delay and 3D minimum delay may be determined. For example, using the illustration above, except with a 2D minimum of −50 ms and a 3D minimum delay of +100 ms, if it is determined that the video signals are 2D, the user could be presented with the eight delay steps defined above, and if the video signals are determined to be 3D, the user could be presented with 11 delay steps: +4 (=+100 ms) to +14 (=+350 ms).

Due to the large difference in processing times for 2D and 3D video signals, the audio system of FIGS. 1 and 2 and the process of FIG. 3 is most effectively used for 2D and 3D signals. However, the audio system of FIGS. 1 and 2 and the processes of FIGS. 3 and 4 can be used for other situations in which the video processing times might differ. For example, SD video signals may take longer than HD video signals, and it may be appropriate to apply a longer audio delay if the corresponding video signals are SD.

Figure 4:
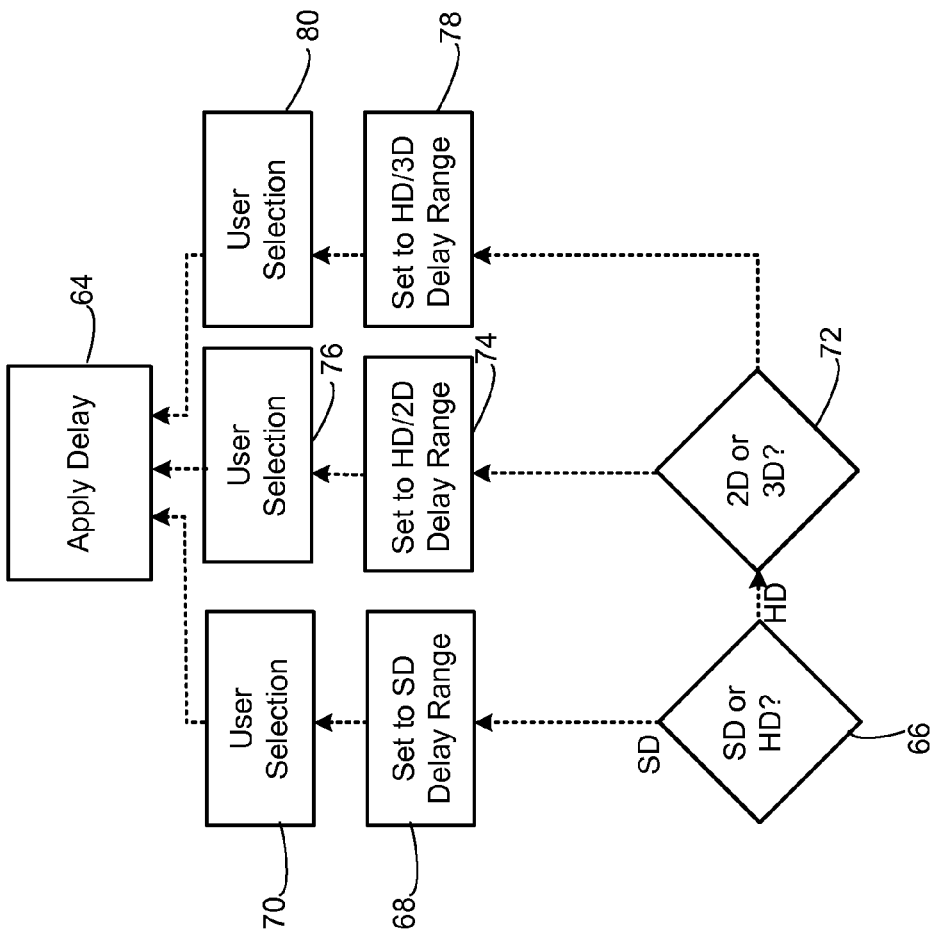
FIGS. 3 and 4 are block diagrams of processes for operating the audio systems of FIGS. 1 and 2.

Additionally, the audio systems of FIGS. 1 and 2 can be used to set the audio based on multiple parameters, for example as shown in FIG. 4. In the process of FIG. 4, the video metadata is examined at block 66 to determine if the video signal is in standard definition format or in high definition format. If the video signal is in standard definition format, at block 68, a time delay (or in the this example, a range of time delays) appropriate to standard definition video signal processing is provided to block 70. At block 70 a time delay within the range of time delays is determined based on user input. The time delay is provided to block 64. At block 64, the time delay is applied to the decoded audio signal.

If it is determined at block 66 that the video signal is in high definition format, at block 72 it is determined if the video signal is in two dimensional format or in three dimensional format. If it is determined that the video signal is in two dimensional format, at block 74, a time delay (or in the this example, a range of time delays) appropriate to high definition/two dimensional video signal processing is provided to block 76. At block 76 a time delay within the range of time delays is determined based on user input. The time delay is provided to block 64, at which the time delay is applied to the decoded audio signal.

If it is determined at block 52 that the video signal is in three dimensional format, at block 78, a time delay (or in the this example, a range of time delays) appropriate to high definition/three dimensional video signal processing is provided to block 80. At block 80 a time delay within the range of time delays is determined based on user input. The time delay is provided to block 64. At block 64, the time delay is applied to the decoded audio signal.

The user input at blocks 70, 76, and 80 can be provided, for example, by a mechanical slide bar or rotary knob, or by a user controllable graphical representation of a mechanical slide bar or knob, or by a user controllable digital user interface. The setting of delay ranges at blocks 68, 74, and 78 rather than the setting of specific time delays permits giving the user the opportunity to fine tune the synchronization independently for two dimensional standard definition format, two dimensional high definition format, or three dimensional high definition format. A more complex process could also provide the capability for fine tuning synchronization for three dimensional standard definition format, but if may not be efficient or cost effective, since three dimensional format is rarely if ever implemented in standard definition.

The logical operations of FIGS. 3 and 4 can be performed by a microprocessor executing software instructions. The microprocessor may be a general purpose microprocessor or may be a specialized digital signal processor (DSP). Blocks 52, 72, and 66 are typically performed by a microprocessor associated with the a-v signal processor 204. Block 64 is typically performed by a microprocessor associated with audio signal processor 206. Blocks 54, 56, 60, 62, 68, 70, 74, 76, 78, and 80 may be performed by a microprocessor or a DSP associated with either a-v signal processor 204 or audio signal processor 206. However, as stated above, operations of a-v signal processor 204 and of audio signal processor 206 may be performed by the same microprocessor or DSP.

Figure 5:
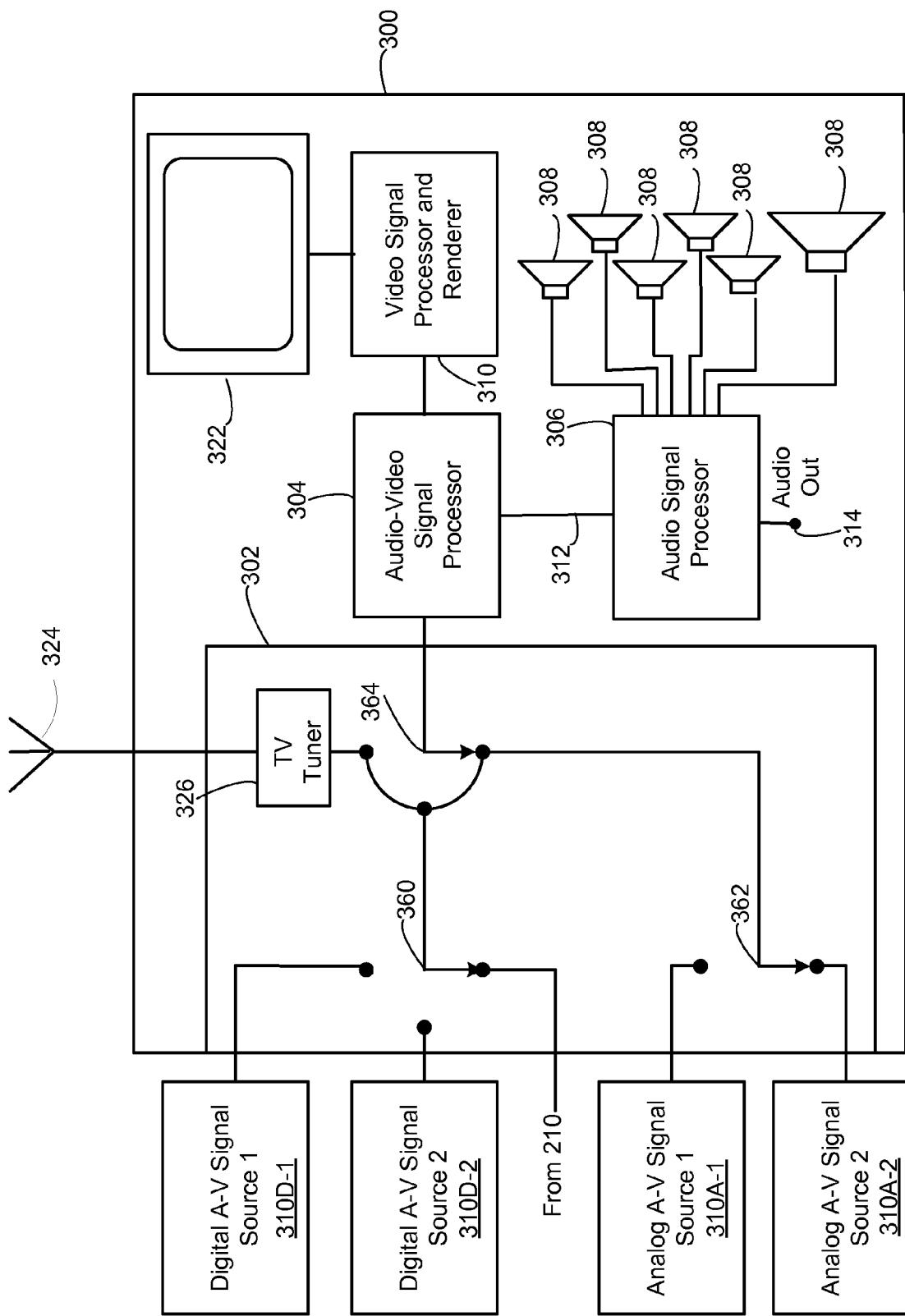
FIG. 5 is a block diagram of a television.

FIG. 5 shows the logical arrangement of television 300 that is suitable to be used with the audio system of FIGS. 1 and 2. The television 300 includes an a-v receiver 302. The a-v signal receiver 302 is operationally coupled to an a-v signal processor 304. The a-v signal processor 304 is operationally coupled to an audio signal processor 306. The a-v signal processor 304 is also operationally coupled to a video signal processor and renderer 310. The video signal processor and renderer 310 is operationally coupled to a video display 322.

In operation, the a-v signal receiver 302 receives digital a-v signals from an a-v signal source as will be described below and provides the a-v signal to the a-v signal processor 304. The a-v signal processor separates the audio signals from the video signals, and provides the audio signals to the audio signal processor 306 through audio signal line 312 and provides the video signals to the video signal processor and renderer 310. The audio signal processor 306 processes the audio signals and provides the processed audio signals to acoustic drivers 308 which radiate sound corresponding to a video image on the video display 322.

In the television of FIG. 5, receiver 302 includes a switch 360 that permits the selection of one of digital audio sources 310D-1-310D-2, or from video signal transmitter 210 of FIGS. 1 and 2; a switch 362 that permits the selection of one of the analog sources 310A-1 or 310A-2; and a switch 364 that permits the selection of the analog source from switch 362, the digital source from, switch 360, or a source built into the television, such as a broadcast antenna 324 or a internet video client and an internal tuner 326.

If the television 300 is configured with an "audio out" terminal 314, the output from terminal 314 can be input to audio system 120 through signal line 280 of FIG. 1, so that audio from devices 310D-1-310D-2 and 310A-1 and 310A-2 or one of the television's own internal sources such as a broadcast antenna or an internet video client can be reproduced through the audio system 120 of FIGS. 1 and 2.

Examples of digital audio-video sources 310D-1-310D-2 are cable or satellite receivers; digital video recorders (DVRs) or personal video recorders (PVRs); DVD players and others. Examples of analog audio-video sources 310A-1 and 310A-2 are VCRs and some a-v gaming consoles.

Numerous uses of and departures from the specific apparatus and techniques disclosed herein may be made without departing from the inventive concepts. Consequently, the invention is to be construed as embracing each and every novel feature and novel combination of features disclosed herein and limited only by the spirit and scope of the appended claims.

What is claimed is:

1. A method for processing input audio/video signals, for use with a television and a separate audio system comprising a plurality of acoustic drivers, the method comprising:
   automatically examining video signal metadata provided in the input video signal and determining if the video signals are in standard definition or high definition format;
   automatically examining video signal metadata provided in the input video signal and determining if the video signals are in two dimensional or three dimensional format;
   if the input video signals are in two dimensional format, providing a first range of time delays to be applied to the audio signals, where the first range of time delays is bounded by a first minimum delay and a first maximum delay, and is broken up into a first series of audio delay steps, where each step represents a fraction of the first range of time delays;
   if the input video signals are in three dimensional format, providing a second range of time delays to be applied to the audio signals, where the second range of time delays is bounded by a second minimum delay and a second maximum delay, and is broken up into a second series of audio delay steps, where each step represents a fraction of the second range of time delays;
   wherein the second minimum delay is longer than the first minimum delay;
   wherein the second maximum delay is longer than the first maximum delay;
   displaying the number of audio delay steps which when selected, represent the audio signal time delay;
   providing a manually operable control to allow for user selection of the number of delay steps:
   after the user selects a number of delay steps, determining an audio signal delay based on the selected number of steps; and
   applying the determined delay to the input audio signals and then applying the delayed audio signals to the plurality of acoustic drivers. to create the audio output from the input audio/visual signals.

2. The method of claim 1, further comprising:
   removing audio signal data from the audio signals to provide modified audio signals.

3. The method of claim 2, further comprising:
   transmitting the modified audio signals to the television, wherein the modified audio signals cause a loudspeaker system of the television to radiate no sound.

4. The method of claim 1, wherein the second minimum delay is longer than the first maximum delay.

5. The method of claim 1, further comprising:
   removing audio signal data from the audio signals to provide modified audio signals; and
   transmitting the video signals to a television for processing.

6. The method of claim 5, further comprising:
   transmitting the modified audio signals to the television, wherein the modified audio signals cause a loudspeaker system of the television to radiate no sound.

7. An audio system, comprising:
   circuitry for receiving audio-video signals. where the video signals comprise metadata;
   circuitry for transducing audio signals to provide sound waves that are synchronized with a video image;
   circuitry for examining the video signal metadata and determining if the video signals are in standard definition or high definition format, and if the video signals are in two dimensional format or three dimensional format;
   circuitry for delaying the audio signals by a first amount if the video signals are in two dimensional format, wherein the circuitry for delaying the audio signals by a first amount if the video signals are in two dimensional format comprises circuitry that provides a first range of time delays to be applied to the audio signals, where the first range of time delays is bounded by a first minimum delay and a first maximum delay, and is broken up into a first series of audio delay steps, where each step represents a fraction of the first range of time delays;
   circuitry for delaying the audio signals by a second amount, longer than the first amount if the video signals are in three dimensional format, wherein the circuitry for delaying the audio signals by a second amount if the video signals are in three dimensional format comprises circuitry that provides a second range of time delays to be a shed to the audio signals where the second ran e of time delays is bounded b second minimum delay and a second maximum delay, and is broken up into a second series of audio delay steps, where each step represents a fraction of the second range of time delays;
   wherein the second minimum delay is longer than the first minimum delay and the second maximum delay is longer than the first maximum delay;
   a display for visually displaying the number of audio delay steps which when selected, represent the audio signal time delay;
   a manually operable control to allow for user selection of the number of delay steps;
   circuitry that, after the user selects a number of delay steps, determines an audio signal delay based on the selected number of steps;
   circuitry that applies the determined delay to the input audio signals and then applies the delayed audio signals to the plurality of acoustic drivers, to create the audio output from the input audio/visual signals; and
   circuitry for transmitting the video signals to a video reproduction system that operates independently of the audio system.

8. The audio system of claim 7, further comprising:
   circuitry for removing audio signal data from the audio signals prior to transmission to the video reproduction system.

9. The audio system of claim 7, wherein the manually operable control comprises a user controllable graphical representation of a manually operable control to provide the user input.

10. The audio system of claim 7, wherein the manually operable control comprises a user controllable digital user interface to provide the user input.

11. The audio system of claim 7, further comprising circuitry for removing audio signal data from the audio signals to provide modified audio signals.

12. The audio system of claim 11, wherein the circuitry for removing audio signal data causes a loudspeaker system of the video reproduction system to radiate no sound.

* * * * *